US009793822B2

United States Patent
Boni et al.

(10) Patent No.: US 9,793,822 B2
(45) Date of Patent: Oct. 17, 2017

(54) METHOD FOR OPERATING AN ELECTRICAL CIRCUIT AND ELECTRICAL CIRCUIT

(71) Applicant: GE Energy Power Conversion Technology Limited, Rugby (GB)

(72) Inventors: Marco Boni, Berlin (DE); Christoph Saniter, Berlin (DE)

(73) Assignee: GE Energy Power Conversion Technology Limited (GB)

( * ) Notice: Subject to any disclaimer, the term of this patent is extended or adjusted under 35 U.S.C. 154(b) by 0 days.

(21) Appl. No.: 14/807,825

(22) Filed: Jul. 23, 2015

(65) Prior Publication Data

US 2015/0333656 A1     Nov. 19, 2015

Related U.S. Application Data

(63) Continuation of application No. 13/534,215, filed on Jun. 27, 2012, now Pat. No. 9,112,427.

(30) Foreign Application Priority Data

Jun. 28, 2011   (DE) .................. 10 2011 078 211

(51) Int. Cl.
    *H02M 5/458*     (2006.01)
    *H02M 7/25*     (2006.01)
    *H02M 1/32*     (2007.01)

(52) U.S. Cl.
    CPC .......... *H02M 7/25* (2013.01); *H02M 5/4585* (2013.01); *H02M 2001/322* (2013.01)

(58) Field of Classification Search
    CPC . H02M 5/4585; H02M 7/25; H02M 2001/322
    See application file for complete search history.

(56) References Cited

U.S. PATENT DOCUMENTS 4,967,133 A    10/1990   Hasegawa
7,135,835 B2 *   11/2006   Yamada .................. H02P 23/06
                                                                                               318/800

(Continued)

FOREIGN PATENT DOCUMENTS

DE            37 90865 C2     8/1990
DE        102007042246 A1     5/2009
WO         2011020786 A1     2/2011

OTHER PUBLICATIONS

Unofficial English Translation of European Search Report and Opinion issued in connection with corresponding EP Application 12172432.2 on Feb. 2, 2015.

(Continued)

*Primary Examiner* — Matthew Nguyen
(74) *Attorney, Agent, or Firm* — Wood IP LLC

(57) ABSTRACT

A method for operating an electrical circuit, in particular of a converter is described. The circuit, in at least one embodiment, includes a line-side converter that is coupled to a capacitor. The line-side converter includes at least two series connections, each including at least two power semiconductor elements, and each of the at least two series connections being connected parallel to the capacitor. The line-side converter is coupled to an energy supply system. The DC voltage that is present at the capacitor is determined. A maximum voltage is predetermined. If the DC voltage present at the capacitor is determined to be greater than the maximum voltage, then at least two of the power semiconductor elements are switched into their conductive state in such a manner that the capacitor is discharged in the direction of the energy supply system.

6 Claims, 2 Drawing Sheets

(56) References Cited

U.S. PATENT DOCUMENTS

| | | | | |
|---|---|---|---|---|
| 7,952,876 | B2* | 5/2011 | Azuma | B60L 3/12 |
| | | | | 361/699 |
| 9,112,427 | B2* | 8/2015 | Boni | H02M 5/4585 |
| 2005/0265059 | A1* | 12/2005 | Tracy | H02M 7/003 |
| | | | | 363/132 |
| 2006/0033466 | A1 | 2/2006 | Yamada et al. | |
| 2009/0086515 | A1* | 4/2009 | Sakakibara | H02M 5/4585 |
| | | | | 363/37 |
| 2011/0007531 | A1* | 1/2011 | Sakakibara | H02M 5/4585 |
| | | | | 363/37 |

OTHER PUBLICATIONS

Examination Report on German Patent Application No. 10 2011 078 211.7 dated May 21, 2012.

* cited by examiner

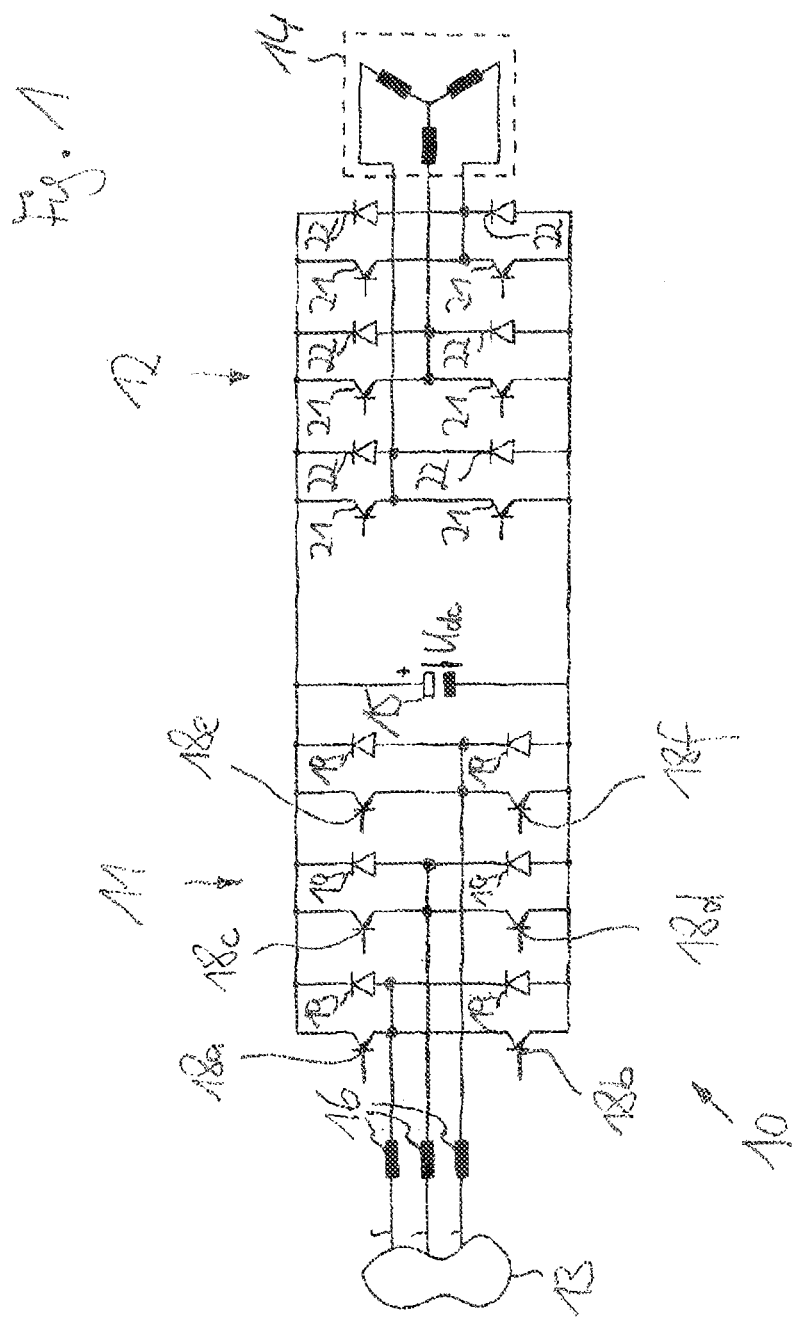

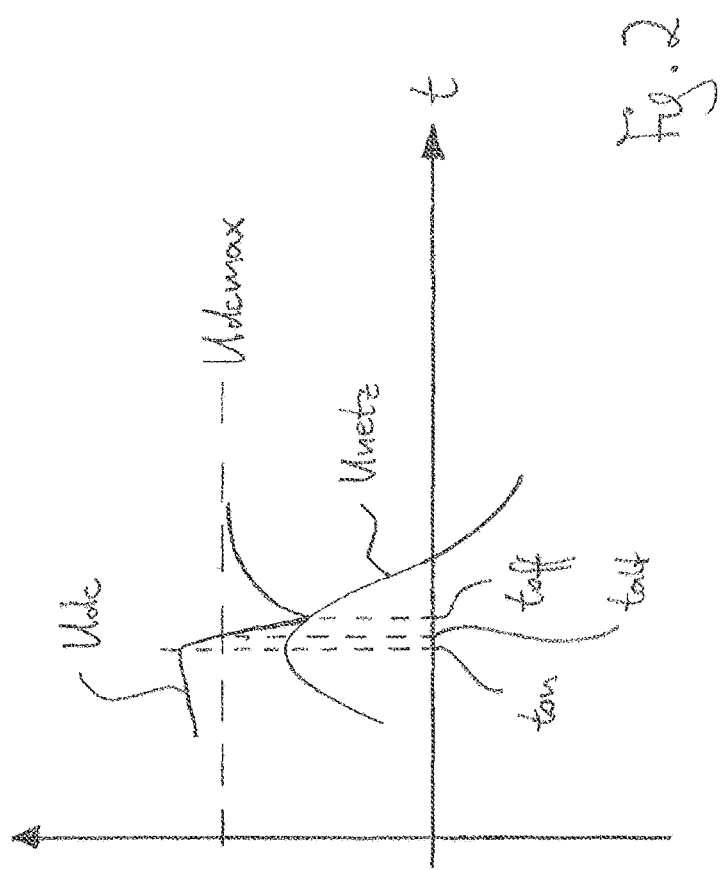

METHOD FOR OPERATING AN ELECTRICAL CIRCUIT AND ELECTRICAL CIRCUIT

CROSS-REFERENCE TO RELATED APPLICATIONS

This application is a continuation of U.S. application Ser. No. 13/534,215, filed Jun. 27, 2012 and is based upon and claims the benefit of priority from German patent application number DE 10 2011 078 211.7 filed Jun. 28, 2011, the entire contents of which are hereby incorporated herein by reference.

FIELD

At least one embodiment of the invention generally relates to a method for operating an electrical circuit, in particular a converter.

A circuit is known from DE 10 2007 042 246 A1. In FIG. 1 of this document, a line-side converter 22 is connected to a machine-side inverter (20) via a DC link. The DC link has an energy storage unit 26 in the form of a capacitor. A so-called DC link voltage or intermediate circuit voltage is applied to the capacitor.

Particularly the machine-side inverter usually comprises switchable power semiconductor elements, for example IGBT's (IGBT=insulated gate bipolar transistor) or GTO thyristors (GTO=gate turn off), or the like. The power semiconductor elements can only be switched on and/or off within predetermined voltage limits. Switching into the non-conductive state outside of the voltage limits can result in damage to or even to destruction of the respective power semiconductor element. If, for example, IGBT's are present, the IGBT's can only be switched off, i.e. switched into a non-conductive state, if the intermediate circuit voltage at the capacitor does not exceed a predetermined maximum voltage.

It is however possible that, for any reason, the intermediate circuit voltage at the capacitor will increase and exceed the predetermined maximum voltage. In this case, DE 10 2007 042 246 A1 provides for a so-called chopper circuit 24 that is shown in FIG. 1 and that comprises a resistance and a transistor that is connected in series to the resistance. If the intermediate circuit voltage exceeds the predetermined maximum voltage, the transistor can be switched into a conductive state, resulting in a parallel circuit of the capacitor, to which the circuit voltage is applied, and the resistance. Consequently, the capacitor can discharge via the resistance and thus the intermediate circuit voltage decreases.

Apparently, DE 10 2007 042 246 A1 requires a higher expenditure, particularly with regard to the indicated chopper circuit.

SUMMARY

In at least one embodiment of the invention, an electrical circuit with a lower expenditure is created.

At least one embodiment of the invention is based upon an electrical circuit that includes a line-side converter coupled to a capacitor. The line-side converter includes at least two series connections of at least two power semiconductor elements each, wherein each power semiconductor element is connected parallel to the capacitor. The line-side converter is coupled to an energy supply system. According to at least one embodiment of the invention the DC voltage being present at the capacitor is determined. A maximum voltage is predetermined. If the DC voltage is greater than the maximum voltage, at least two of the power semiconductor elements are switched into their conductive state in such a manner that the capacitor is discharged in the direction of the energy supply system.

By way of at least one embodiment of the invention a discharge of the capacitor is rendered possible, without requiring a chopper circuit or other additional components to do so. The DC voltage and/or circuit voltage present at the capacitor can thus, without great expenditure, be brought back into the predetermined voltage limits, in which the power semiconductor elements can be switched on and above all, also switched off.

In advantageous embodiments of the inventions, the power semiconductor elements that are switched into their conductive state will be switched back into their non-conductive state only when the DC voltage is lower than the maximum voltage, or the power semiconductor elements that are switched into their conductive state will be switched back into their non-conductive state only when the DC voltage is equal to an AC voltage present at the energy supply system. Thus, the power semiconductor elements that are switched into a conductive state in order to discharge the capacitor will not be switched into a non-conductive state corresponding to a normal operation, but in dependence of the maximum voltage or the AC voltage. This ensures that the power semiconductor elements will not be damaged.

BRIEF DESCRIPTION OF THE DRAWINGS

Further features, possible applications and advantages of the invention result from the following description of embodiments of the invention that are presented in figures. All described or presented features form, per se or in any combination, the subject matter of the invention, regardless of their abstract in the patent claims or reference thereof, as well as regardless of their wording and/or presentation in the description and/or the figures.

FIG. 1 shows a schematic circuit diagram of an embodiment of an inventive electrical circuit; and FIG. 2 shows a schematic timing diagram of voltage curves of the circuit of FIG. 1.

It should be noted that these Figures are intended to illustrate the general characteristics of methods, structure and/or materials utilized in certain example embodiments and to supplement the written description provided below. These drawings are not, however, to scale and may not precisely reflect, the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EXAMPLE EMBODIMENTS

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.)

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an electrical circuit 10 that comprises a line-side converter 11 and machine-side converter 12. In the present embodiment, the line-side converter 11 is connected to a three-phase energy supply system 13. In the present embodiment a three-phase load 4 is connected to the machine-side converter 12 in a star-connected mode, the load either being a generator or an electric motor. A capacitor 15 is interconnected between the line-side converter 11 and the machine-side converter 12, wherein the capacitor can also be a capacitor bank in the form of a plurality of capacitors that are connected parallel and/or in series. Choking coils 16 or other inductances can be present between the line-side converter 11 and the energy supply system 13.

It should be noted that also a two-phase energy supply system or a two-phase or multi-phase load may be involved.

The line-side converter 11 in the present embodiment is designed in a three-phase manner. It is understood that the converter 11 may also be designed in a two-phase or multi-phase manner.

The line-side converter 11 comprises six switchable power semiconductor elements 18a, 18b, 18c, 18d, 18e, 18f, each of which being provided with a diode 19 that is connected parallel and in the opposite direction. There are always two power semiconductor elements 18a, 18b and 18c, 18d, 18e, and 18f, respectively, connected in series, and this in the forward direction from a positive potential to a negative potential. The capacitor 15 is connected parallel to the resulting three series connections. A DC voltage Udc directed from the positive to the negative potential is present at the three series connections and thus to the capacitor 15. The magnitude of the DC voltage Udc can be determined by a control device and/or monitored by means of sensors in a manner that is not presented.

The connection points of the two power semiconductor elements 18a, 18b and 18c, 18d, 18e, and 18f, respectively, of each of the three series connections are connected to one phase of the energy supply system 13 respectively.

The power semiconductor elements 18a, 18b, 18c, 18d, 18e, 18f are designated below in their entirety also by the reference sign 18.

The machine-side converter 12 comprises six switchable power semiconductor elements 21, each of which being provided with a diode 22 that is connected parallel and in the opposite direction. There are always two power semiconductor elements 21 connected in series, and this in the forward direction from the positive potential to the negative potential. The capacitor 15 is connected parallel to the three-series connections thereby created. The DC voltage Udc directed from the positive to the negative potential is present at the three series connections and thus at the capacitor 15.

Each of the connection points of the two power semiconductor elements 21 of each of the three series connections are connected to a phase of the load 14, respectively.

The power semiconductor elements 18, 21 can involve IGBT's (IGBT=insulated gate bipolar transistor), for example, which can also be interconnected in a modular manner. The power semiconductor elements 18, 21 can be individually actuated by the control device already mentioned in a manner that is not presented and thus be switched into a conductive or a non-conductive state.

It should be pointed out that the line-side converter 11 and/or the machine-side converter 12 can also be a three-phase or multi-phase converter, for example a so-called three-phase NPC converter.

In a normal motor operation with, for example, an electric motor as the load 14, the AC voltages present between the phases of the energy supply system 13 are commutated by the line-side converter 11 and thus converted into the DC voltage Udc applied to the capacitor 15. In order for this to be achieved the power semiconductor elements 18 are actuated accordingly. The DC voltage Udc is then transformed by the machine-side converter 12 into a voltage similar to AC voltage that is transmitted to the phases of the load 14. In order for this to be achieved the power semiconductor elements 21 are actuated accordingly. The frequency of the AC voltage of the energy supply system 13 thereby differs usually form the frequency of the voltage on the load 14. Thus, the electric motor can be supplied with energy and thereby driven accordingly.

In a normal generator operation, with, for example, a generator as the load 14, the energy is transmitted in the reverse direction. The generator produces energy that is converted into the DC voltage by the machine-side converter 12 and then fed into the energy supply system 13 by the line-side converter 11. In order for this to be achieved the power semiconductor elements 18, 21 are actuated accordingly. Here also the frequency of the generator usually differs from the frequency of the energy supply system 13.

Now, it is possible, that the DC voltage Udc on the capacitor 15 increases for any reason. If the DC voltage lies above the maximum voltage Udcmax that can be switched off by the power semiconductor elements (thus if Udc>Udcmax), switching of the power semiconductor elements 18, 21 into their non-conductive state could lead to damage or destruction of the respective power semiconductor element 18, 11. In order to prevent such a damage or destruction, the power semiconductor elements 18, 21 are switched into their non-conductive state when the maximum voltage Udcmax is passed (thus if Udc=Udcmax). Furthermore, such a repeated switching into the non-conductive state is blocked at least for so long as the maximum voltage Udcmax continues to be exceeded (thus, as long as Udc>Udcmax). The normal operation of the electrical circuit 10 described above that requires a continuous switching on and off of the power semiconductor elements 18, 21, is thus at least temporarily interrupted.

In FIG. 2 the DC voltage Udc that is applied to the capacitor 15 is applied over the time t. Furthermore, the maximum voltage Udcmax indicated above is entered. The maximum voltage Udcmax can be a constant value, as exemplarily shown, but also a variable value. Furthermore, the AC voltage Unetz that is present on one of the phases of the energy supply system 13 is applied over the time t. The maximum voltage Udcmax is thereby greater in terms of value than the maximum value of the AC voltage Unetz in terms of value.

Starting point is the state already described that the DC voltage Udc is greater than the maximum voltage Udcmax and that therefore the power semiconductor elements 18, 21 are in their non-conductive state. The state is recognized and produced by the control device, and is present in FIG. 2 before the point in time ton.

The point in time ton as such lies, in terms of time, approximately within the maximum in terms of value of the AC voltage Unetz.

Approximately at the point in time ton, the two power semiconductor elements 18a, 18d for example are switched by the control device into their conductive state. This is possible, since only the switching into the non-conductive state is blocked. This results in an electric connection from the positive potential via the power semiconductor element 18a, via the energy supply system 13, and via the power semiconductor element 18d to the negative potential.

Alternatively or additionally, also the power semiconductor elements 18a, 18f and/or 18c, 18b and/or 18c, 18f and/or 18e, 18b and/or 18e, 18d can be switched into their conductive state. In each of these combinations, an electrical connection is created from the positive potential via the energy supply system 13 to the negative potential.

The electric connection created by the described switching of the respective power semiconductor elements from the positive potential via the energy supply system 13 to the negative potential allows for a discharge of the capacitor 15 towards the energy supply system 13. The discharge results in a reduction of the DC voltage applied to the capacitor 15. This is shown in FIG. 2 after the point in time ton.

The control device now monitors when the DC voltage Udc becomes equal to the AC voltage Unetz. This is the case in FIG. 2 at the point in time toff.

At the point in time toff the power semiconductor elements that are switched into their conductive state are switched back into their non-conductive state. This is possible because the DC voltage Udc that is applied to the capacitor 15 is now lower than the maximum voltage Udcmax. Thus, a switching of the power semiconductor elements into their non-conductive state is no longer blocked.

It is alternatively possible that the power semiconductor elements that are switched into their conductive state are not switched off until the point in time toff is reached, but already at that point in time, at which the DC voltage Udc falls below the maximum voltage Udcmax. This is the case at the point in time talt in FIG. 2.

After the DC voltage Udc that is applied to the capacitor 15 is again lower than the maximum voltage Udcmax, and after the power semiconductor elements mentioned above have been switched back to their non-conductive state, the entire electrical circuit 10 can again be operated in the normal operation described. This results from the fact that a switching of the power semiconductor elements 18, 21 into their non-conductive state is no longer blocked since the DC voltage has fallen below the maximum voltage Udcmax.

If necessary, the control device determines the compensating current that would flow after the point in time ton, before switching the indicated power semiconductor elements into their conductive state at the point in time ton. The compensating current depends particularly upon the DC voltage Udc, the maximum voltage Udcmax, the counter voltage Unetz, the present inductive and capacitive loads, etc. If the determined compensating current exceeds a predetermined value, the power semiconductor elements cannot be readily switched into their conductive state, but further measures that are presently not described in more detail, must be taken beforehand.

It should be pointed out that, deviating from FIG. 1, the load 14 can also be a second electric energy supply system, for example a railroad system. In this case, capacitor 15 can also be discharged in the direction of the second energy supply system 14. Likewise, it should be pointed out that the first energy supply system 13 and/or the load 14 of FIG. 1 can also be designed in a two-phase or multi-phase manner.

Furthermore, it should be pointed out that, deviating from FIG. 1, the line-side converter and/or the machine-side converter 11, 12 can also be so-called multi-level circuits. In these cases, it may be necessary to switch several of the present power semiconductor elements into a conductive state, in order to produce a discharge of the capacitor 15 in the direction of the or to the energy supply system/s.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating an electrical circuit including (i) first and second converters and (ii) a capacitor interconnected therebetween, each converter including at least two series connected power semiconductor elements in parallel with the capacitor, the first converter being configured for coupling to an energy supply, the method comprising:
    applying a direct current (DC) voltage to the capacitor via the energy supply; and
    switching the at least two power semiconductor elements in either the first converter or the second converter into a conductive state when (i) the DC voltage exceeds a maximum voltage associated with the first and second converter semiconductor elements and (ii) an alternating current (AC) voltage responsive to the energy supply is approximately maximum.

2. The method of claim 1, further comprising switching the at least two power semiconductor elements in either the first converter or the second converter into a nonconductive state when the DC voltage applied to the capacitor is lower than the maximum voltage.

3. The method of claim 1, wherein the at least two power semiconductor elements in either the first converter or the second converter are switched into the conductive state such that an electrical connection from a positive potential via the energy supply to a negative potential is created; an
    wherein the DC voltage at the capacitor is present between the positive and the negative potential.

4. The method of claim 1, wherein the at least two power semiconductor elements in either the first converter or the second converter are switched into a nonconductive state when the maximum voltage is exceeded.

5. The method of claim 4, wherein switching the at least two power semiconductor elements in either the first converter or the second converter into the nonconductive state is blocked after the maximum voltage is exceeded.

6. A computer readable storage device having stored thereon instructions which, when executed by a processor, cause the processor to perform a method for operating an electrical circuit including (i) first and second converters and (ii) a capacitor interconnected therebetween, each converter including at least two series connected power semiconductor elements in parallel with the capacitor, the first converter being configured for coupling to an energy supply, the method comprising:
    applying a direct current (DC) voltage to the capacitor via the energy supply; and
    switching the at least two power semiconductor elements in either the first converter or the second converter into a conductive state when (i) the DC voltage exceeds a maximum voltage associated with the first and second converter semiconductor elements and (ii) an alternating current (AC) voltage responsive to the energy supply is approximately maximum.

* * * * *